United States Patent
Takizawa et al.

(10) Patent No.: US 8,661,934 B2
(45) Date of Patent: Mar. 4, 2014

(54) BICYCLE BRAKE LEVER

(75) Inventors: Shinichi Takizawa, Sakai (JP); Tatsuya Matsuchita, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 390 days.

(21) Appl. No.: 12/695,938

(22) Filed: Jan. 28, 2010

(65) Prior Publication Data

US 2010/0139447 A1    Jun. 10, 2010

Related U.S. Application Data

(62) Division of application No. 11/400,969, filed on Apr. 7, 2006, now Pat. No. 7,654,367.

(30) Foreign Application Priority Data

Jun. 14, 2005    (EP) .................................... 05012773

(51) Int. Cl.
B62L 3/02    (2006.01)

(52) U.S. Cl.
USPC .......... 74/525; 188/24.11; 188/344; 74/502.2; 74/489

(58) Field of Classification Search
USPC ........... 74/473.14, 489, 502.2, 523, 525, 518; 188/24.11, 24.22, 344; 60/594
IPC ........................................................ B62L 3/02
See application file for complete search history.

(56) References Cited

U.S. PATENT DOCUMENTS

| | | | |
|---|---|---|---|
| 4,005,613 A * | 2/1977 | Kaufman et al. ............... | 74/489 |
| 4,348,916 A * | 9/1982 | Shimano ......................... | 74/489 |
| 4,611,500 A * | 9/1986 | Nagano ........................... | 74/489 |
| 4,779,482 A | 10/1988 | Kawaguchi | |
| 5,050,381 A | 9/1991 | Matsuno | |
| 5,636,518 A | 6/1997 | Burgoyne | |
| 5,813,501 A | 9/1998 | Terry, Sr. | |
| 6,336,327 B1 * | 1/2002 | Noro et al. ...................... | 60/533 |
| 6,457,378 B2 * | 10/2002 | Hatakoshi et al. .............. | 74/525 |
| 2003/0183038 A1 | 10/2003 | Cornolti | |
| 2005/0199450 A1 | 9/2005 | Campbell | |

FOREIGN PATENT DOCUMENTS

| | | | | |
|---|---|---|---|---|
| DE | 89132785 U1 | 5/1990 | | |
| DE | 10017199 A1 | 10/2001 | | |
| EP | 1160152 A1 | 12/2001 | | |
| FR | 2024653 | 8/1970 | | |
| JP | 2001097271 A | * | 4/2001 | ................ B62L 3/02 |

OTHER PUBLICATIONS

Office Action dated Jul. 31, 2008 issued in corresponding U.S. Appl. No. 11/400,969.
Office Action dated Jan. 23, 2009 issued in corresponding U.S. Appl. No. 11/400,969.
Office Action dated May 29, 2009 issued in corresponding U.S. Appl. No. 11/400,969.

* cited by examiner

Primary Examiner — Thomas Diaz
(74) Attorney, Agent, or Firm — Jeffer Mangels Butler & Mitchell LLP

(57) ABSTRACT

An actuator unit for a hydraulic brake mechanism on two-wheelers, comprising a housing fastened to the handlebar, a brake cylinder being arranged substantially perpendicular to the handlebar in the housing, a piston movable in it and a brake lever acting on the piston at an intermediate portion remote from either end of the lever, the lever being mounted at one end thereof to rotate relative to the housing, wherein the brake lever is mounted adjustably movable with respect to an axis substantially at an end of the lever, the axis being unchangeable in position but rotatably mounted to the housing, the adjustment option being provided for by the adjustment mechanism, wherein the lever, the adjustment mechanism and the axis rotate together relatively to the housing upon operation.

10 Claims, 3 Drawing Sheets

BICYCLE BRAKE LEVER

This application is a divisional of U.S. patent application Ser. No. 11/400,969, filed Apr. 7, 2006, now U.S. Pat. No. 7,654,367, the entirety of which is incorporated herein by reference.

FIELD OF THE INVENTION

The invention concerns an actuator unit for a hydraulic brake on two-wheelers.

BACKGROUND OF THE INVENTION

In recent years, certain high performance bicycles have included hydraulic brakes. The reach adjustment for the brake levers for these types of brakes are typically complicated and involve expensive components.

It is therefore a task of the invention to design an actuator unit of a hydraulic brake, so that adjustment of the reach occurs by simple, cost-effective parts that are easy to install.

SUMMARY OF THE PREFERRED EMBODIMENTS

The task is solved according to the invention in that the actuator unit for a hydraulic brake mechanism comprises a housing configured to be attached to the handlebar, a brake cylinder arranged to be configured substantially perpendicular to the handlebar in the housing, a piston configured to be moved in the brake cylinder, a brake lever configured to be pivotably attached to the housing to rotate about an axis of rotation, the brake lever being operatively associated with the piston to move the piston, and a reach adjustment mechanism configured to be operatively associated with the brake lever to move the brake lever for selecting a starting position of brake lever, wherein the axis of rotation of the brake lever is unchangeable in position respect to the housing, and wherein the reach adjustment mechanism moves the brake lever with respect to the axis of rotation of the brake lever.

As an example the brake lever may be mounted adjustably movable with respect to an axis substantially at an end of the lever, the axis being rotatably mounted to the housing, the adjustment option being provided for by the adjustment mechanism, wherein the lever, the adjustment mechanism and the axis rotate together relative to the housing.

Changing the relative position of the lever with respect to the fixed axis of rotation during operation of the brake lever is simpler than adjusting the moving linkage between the lever and the piston. Additionally, it has been found that movement of the lever is particularly improved in such a configuration where the lever is configured to be journaled at one end, to be operated substantially at an opposite end and acting onto the hydraulic braking mechanism between the two ends if reach adjustment is provided for at the end the lever is journaled with. The rotational axis is preferably the center axis of the journal, on which the brake lever is mounted to rotate. Preferably the brake lever is mounted adjustably relatively to the axis of rotation of the brake lever, in particular the mounting being adjustable substantially parallel to the center axis of the brake cylinder, when the brake lever is in a position corresponding to a half stroke.

In a preferred embodiment the reach adjustment mechanism comprises an adjustment bolt, a journal configured to be operatively associated with the adjustment bolt, wherein the journal has a through hole for receiving the adjustment bolt extending there through. Accordingly the lever is guided by the adjustment mechanism allowing for well defined positioning of the lever.

In a particular embodiment the axis of rotation is the center axis of the journal on which the brake lever is mounted to rotate.

The through hole is preferably provided with internal threads, such that reach adjustment can be easily obtained by a rotation of the adjustment mechanism. It is to be noted that other means could be provided for allowing setting of the relative position between the adjustment mechanism such as a bolt and the journal.

The lever may comprise at least one elongated recess or hole for receiving the journal in a guided manner, in particular the elongated hole(s) extending roughly parallel to the center axis of the brake cylinder when the lever is in a position corresponding to a half stroke or preferably to a position corresponding to an intermediate selected start position of the brake lever. Hence, the lever can be guided in a manner as to be guided commonly by the adjustment mechanism and the elongated hole or holes.

The elongated hole (s) can be configured as having ends formed in both directions as stops for the journal. Accordingly the journal can be guided on both sides in the lever in elongated holes that extend roughly parallel to the center axis of the brake cylinder when the lever is in a position corresponding to a half stroke and have ends designed in both directions as stops for the journal. Because of this, the adjustment range of the grip width is limited in simple fashion by design and surpassing of this range is not possible. The production of elongated holes by machining or in a deformation process is very simple.

In a preferred embodiment the adjustment mechanism is comprised of a bolt abutting with the lever on an upper and lower part thereof. This configuration allows for a well defined positioning of the lever substantially without any play, regardless of whether the lever is in an end position or an intermediate position with respect to it's adjustability.

In order to construct the inventive device small and having a nice appearance the lever may be provided with recesses forming abutment regions for the bolt. Accordingly, the heads of the bolt may be received substantially flush with the surrounding surface of the lever.

According to a preferred embodiment the adjustment mechanism comprises indexing means. Such indexing means could be corrugations between any of the heads of the bolt and the housing or other suitable well known means for indexing relative rotational positions.

The lever can comprise a recess of conical shape with rounded apex for engaging the piston. Thus in contrast to the prior art there is provided for uncomplicated actuation of the piston resulting from the fact that the inventive structure provides for adjustability substantially without impairing structural behaviour of the journal supporting the one end of the lever. Thus there is no substantial need for additional guiding of the lever at the place the piston is operated. Nevertheless it is to be noted that such additional guiding may be provided for.

As the reach adjustment is provided for at small distance from the interaction of the lever with the piston it is preferred that the piston is provided with a ball shaped end for engaging the brake lever. Thus easy engagement and operation can be guaranteed.

A preferred embodiment of the invention will now be explained below in detail, with reference to the drawings. The description is to be regarded as illustrative only and should not be understood to restrict the scope of protection as defined by the claims.

DETAILED DESCRIPTION OF THE PREFERRED EMBODIMENTS

Figure 1:
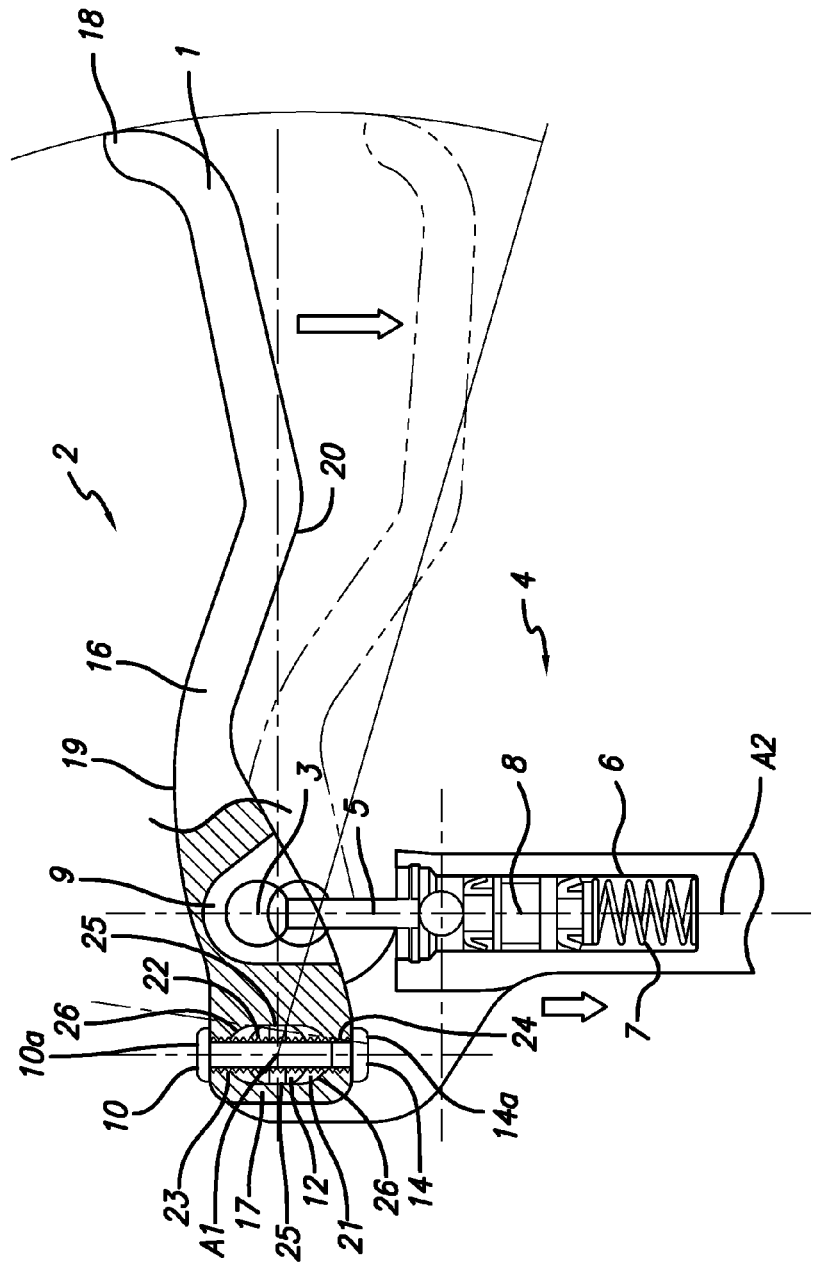
FIG. 1 shows a preferred embodiment of the actuator unit in an intermediate adjustment position.

An actuator unit 2 is fastened to the handlebar 15 of a two-wheeler. It is connected by means of a line to a hydraulic brake (not shown) for braking of the vehicle. It can be a disk brake or a rimbrake. The housing 4 of the device 2 is fastened on the handlebar with a clamp fitting or other suitable fixation. A hole 6 in housing 4 extends essentially perpendicular to the handlebar 15. Its end on the handlebar side is closed, its end facing away from the handlebar 15 is open. The hole 6, in its internal part, forms the brake cylinder 7.

The actuator unit in an intermediate adjustment position is illustrated in detail in FIG. 1. The actuator unit 2 is substantially composed of a housing 4 and a lever 1. In the housing there is provided a hole 6 forming the brake cylinder 7, which defines an axis A2, and in which is guided a master piston 8, which is operated by a piston rod 5 being provided on its end with a spherical portion 3. The brake lever 1 includes a main body portion 16, a pivot end 17, a distal end 18, a top 19 and a bottom 20 and is journaled with the pivot end 17 to the housing 4 in order to be pivotable for pushing downwardly the spherical body 3 and thus the piston rod 5 in order to in turn activate the master piston 8. The brake lever 1 is provided on the end portion that is intended to be journaled to the housing with an elongated hole or opening 21 that includes first and second parallel sides 25 and two rounded ends 26 and in which a journal axle 12 is received.

The journal axle 12 is mounted rotatably in or to the housing 4 and extends through the elongated hole 21. The journal axle 12, which defines the pivot axis A1, is provided with a through hole 22 to which an adjustment bolt formed of two separate parts 10 and 14 is arranged. The adjustment bolt also extends through a top opening 23 and a bottom opening 24 in the main body portion. By means of the adjustment bolt the position of the axle 12 within the elongated hole 21 of the brake lever 1 can be secured in any number of possible positions such that the brake lever 1 is journaled pivotally to the housing 4.

In the position shown in FIG. 1, the pivot or journal axle 12 is positioned substantially in the middle of the elongated hole meaning as much as that the brake lever is configured to be arranged in an intermediate position, thus providing for a medium reach adjustment. Upon operation of the brake lever a conical recess 9 provided in the brake lever 1 with a rounded apex urges the spherical body downwardly to operate the piston rod and, accordingly, the master piston, in order to provide for the hydraulic braking function.

Figure 2:
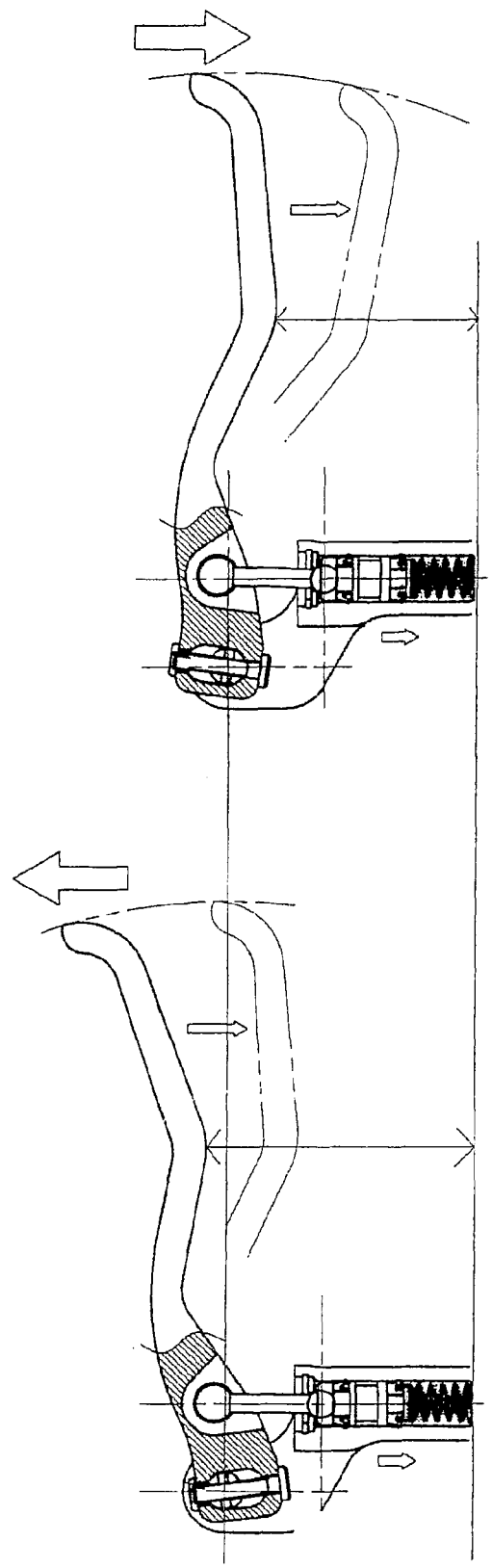
FIG. 2 shows the preferred embodiment of the actuator unit in an adjustment position corresponding to maximum reach and to minimum reach, respectively.

On the left hand side of FIG. 2 the embodiment as shown in FIG. 1 is represented, however with the lever 1 in a position of a maximum reach adjustment. Accordingly, the end portion of lever 1 is journaled with the housing 4 such that the journaled end portion is slightly closer to the handlebar than in the position, as illustrated in FIG. 1, resulting in that the distal end portion is further remote from the handle bar. As shown in FIG. 2 the pivot axle 12 is located in a rounded end of the elongated hole, thus providing for the maximum reach adjustment position.

On the right hand side of FIG. 2 the embodiment shown in FIG. 1 is again illustrated, however this time the lever 1 is in the minimum reach adjustment position. Accordingly, the brake lever 1 is positioned such that the relative position of the axle 12 is on the bottom end of the elongated hole provided for in the brake lever 1. Accordingly, the brake lever is slightly rotated in a clockwise direction when compared to the illustration of FIG. 1. Thus a user having small hands can operate the brake lever.

In summary, it is to be noted that the invention provides for very uncomplicated and inexpensive reach adjustment having the great advantage of not needing any intervention with respect to the hydraulic cylinder piston arrangement in a very easy and convenient manner. The pivot axle always remains in the same position of the housing solely being rotatable in this respect in order to allow in the respective reach adjustment positions common rotation of the axle, the brake lever and the adjusting mechanism.

The inventive configuration has also proven to be particularly beneficial in that, during the reach adjustment, the movement behaviour of the brake lever is slightly changed which change surprisingly copes well with the needs of a user in correspondence of the selected reach adjustment. Furthermore, the provision of the reach adjustment mechanism in a rotatable fashion together with the axle reduces any risks of inadvertent change of the adjustment position as it can occur with any reach adjustment known in the prior art.

Figure 3:
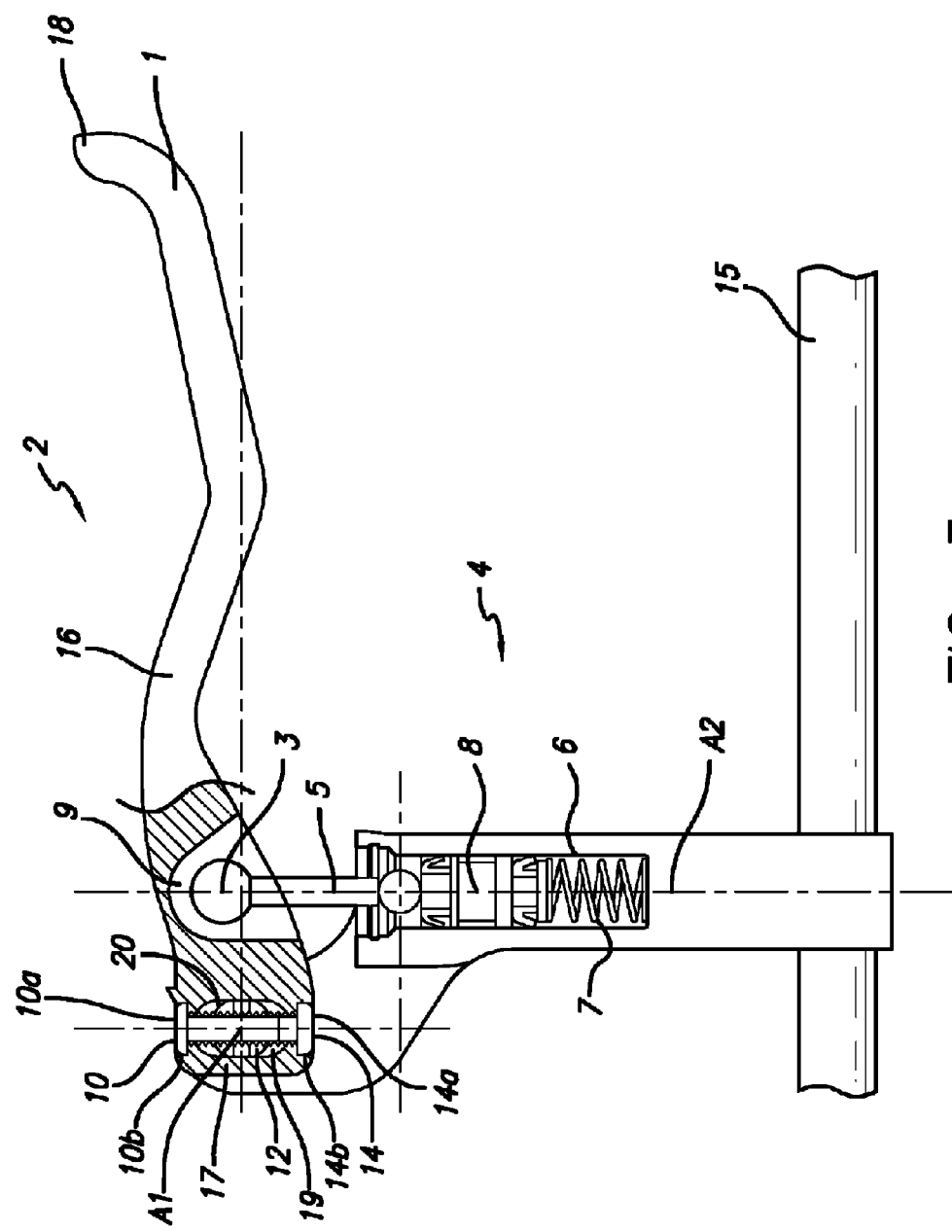
FIG. 3 shows the preferred embodiment of the actuator unit where the brake cylinder is substantially perpendicular to the handlebar.

Various changes and modifications could be envisaged such as to provide the respective heads or abutment parts 10a, 14a of the bolt portions 10, 14 in matching recesses 10b, 14b of the brake lever (as shown in FIG. 3) which recesses 10b, 14b may for instance also be provided with indexing means such as corrugated surfaces in order to provide for indexing function of the reach adjustment.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A brake lever assembly comprising:
   a housing, and
   a brake lever that includes
      a main body portion having a pivot end, a distal end, a top and a bottom, and
      a reach adjustment mechanism disposed adjacent the pivot end of the main body portion, the reach adjustment mechanism including:
         a top opening, a bottom opening, and an elongated opening defined in the main body portion, the elongated opening receiving a journal therein and including two parallel sides and two rounded ends, wherein the journal defines an axis and is rotatably mounted to the housing, and
         an adjustment bolt extending through the top opening, through the elongated opening, through a through hole defined in the journal, and through the bottom opening, wherein the adjustment bolt defines an axis, wherein the elongated opening defines a length in a direction parallel to and co-axial with the axis of the adjustment bolt and the first and second parallel sides, and wherein the journal has a diameter that is less than the length of the elongated opening, wherein when the adjustment bolt is rotated to adjust the reach, the journal rotates about its axis with respect to the housing, the main body portion of the brake lever translates with respect to the journal and the position of the adjustment bolt with respect to the main body portion remains unchanged in a direction parallel to the axis of the adjustment bolt.

2. The brake lever assembly of claim 1 wherein the main body portion includes a conically shaped recess with a rounded apex defined therein.

3. The brake lever assembly of claim 1 wherein the adjustment bolt includes two separate parts.

4. The brake lever of claim 1 wherein the main body portion is rotatable about an axis of rotation, wherein the axis of rotation of the main body portion is unchangeable in position with respect to the journal, and the reach adjustment mechanism moves the entire main body portion with respect to the axis of rotation of the main body portion, such that a different portion of the main body portion is coaxial with the axis of rotation of the main body portion after reach adjustment than was coaxial with the axis of rotation of the main body portion before reach adjustment.

5. The brake lever assembly of claim 1 wherein the main body portion moves with respect to the journal when the adjustment bolt is rotated.

6. The brake lever assembly of claim 1 wherein the adjustment bolt includes an abutment part on each end thereof.

7. The brake lever assembly of claim 6 wherein each abutment part is in contact with the main body portion.

8. The brake lever assembly of claim 7 wherein the main body portion is provided with recesses for receiving the abutment parts of the bolt.

9. The brake lever assembly of claim 1 wherein the main body portion defines at least a maximum reach adjustment start position, an intermediate start position and a minimum reach adjustment start position when the main body portion is associated with a bicycle, and wherein the elongated opening extends in a direction that is substantially perpendicular to a handlebar when the main body portion is in the intermediate start position.

10. The brake lever assembly of claim 1 wherein the main body portion includes a recess defined in the bottom thereof.

* * * * *